Figure 1:
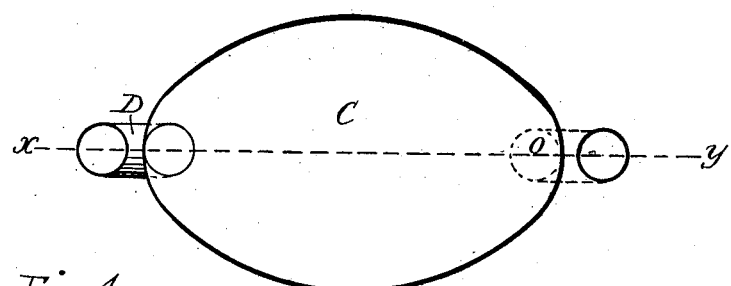

No. 898,136. PATENTED SEPT. 8, 1908.
J. P. PUTNAM.
SEWER GAS TRAP.
APPLICATION FILED SEPT. 2, 1905.

Witnesses.
Florence J. Davis
William E. Downey

Inventor
J. Pickering Putnam

UNITED STATES PATENT OFFICE.

JOHN PICKERING PUTNAM, OF BOSTON, MASSACHUSETTS.

SEWER-GAS TRAP.

No. 898,136.  Specification of Letters Patent.  Patented Sept. 8, 1908.

Application filed September 2, 1905. Serial No. 276,899.

*To all whom it may concern:*

Be it known that I, JOHN PICKERING PUTNAM, of Boston, in the county of Suffolk and State of Massachusetts, have invented certain new and useful Improvements in Sewer-Gas Traps, of which the following is a specification.

The object of my invention is to provide a sewer gas trap which shall possess the maximum power of preserving its water seal under siphoning action, in proportion to its own water capacity, and the invention consists in placing between the lower or inlet bend of the trap and its upper or outlet bend, a chamber having very large uninterrupted horizontal dimensions and a very small vertical dimension, the latter being substantially equal to the diameter of the waste pipe it serves. By giving the chamber this maximum of horizontal extension, limited only by considerations of space and economy, I obtain a reservoir chamber having the maximum of water capacity for a given depth, and by giving it the minimum of depth I obtain the minimum of resistance to the escape of air through the trap during siphoning action, and at the same time the minimum of disturbance and loss of water seal during such action, because the air passes through a shallow body of water with less resistance and disturbance than it does through a deep body of water. In virtue of this form, air suddenly entering the chamber under siphoning action from the lower bend passes most readily through the thin sheet of water in a vertical direction, and with a minimum of disturbance to such water, finds an easy passage along the air space above the water into the sewer. The absolute power of resistance to siphonage is in direct proportion to the volume of this undisturbed water in the reservoir chamber as compared with the capacity and diameter of the inlet bend, and the relative power of resistance of the trap to siphonage as compared with others of its size, is dependent upon the combination of these large horizontal dimensions with the small vertical dimensions and the relation of excess of the former over the latter.

My invention is most useful in places where great siphoning action has to be resisted, but where the water is comparatively free from greasy matters, since the purpose of my invention is to provide a trap having the maximum of resistance to siphonage, and not the maximum of self scouring power. Hence it is intended for use rather under bath tubs where siphonage is expected to be strong, rather than under kitchen sinks where greasy matters collect, and where siphonage resistance is not especially to be feared.

In my former trap patents I have endeavored to combine anti-siphon and self scouring qualities in one device, whereas in this invention I have sought the very greatest possible power of resistance to siphonage compared with the actual size of the trap, without special reference to other qualities. Heretofore exactly the opposite idea as to the manner necessary to obtain this result of resistance to siphonage has prevailed among manufacturers of traps. Instead of giving them small vertical and large horizontal dimensions, they have always considered that they should be made with large vertical and small horizontal dimensions, on the theory that a heavy body of water, or large water "head" was necessary to oppose the suction force of siphonage.

Figure 3:
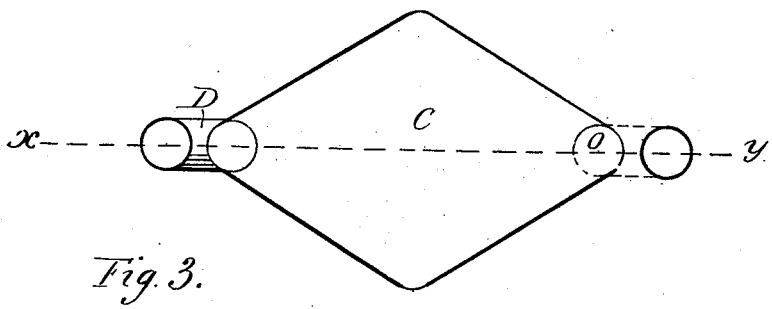

Although I have aimed in this invention only at attaining the greatest power of resistance to siphonage, I nevertheless prefer to give the trap an elliptical form because this form provides an especially good scour with the smallest possible diminution of horizontal area; and I place the inlet and outlet arms for the same reason on the major axis of the ellipse at points most remote from each other. But I do not confine myself to an elliptical form. A round, square or other plan as shown in Figure 3 being equally within the scope of my invention.

Figure 2:
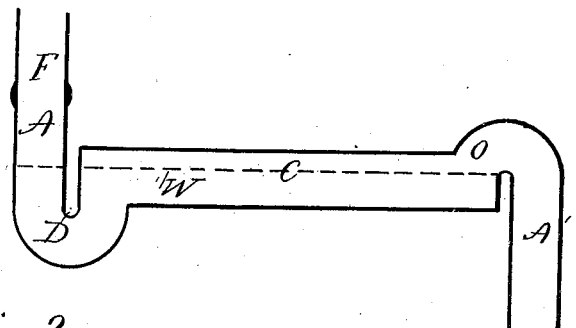

In the drawings, Fig. 1 is a plan, and Fig. 2 a vertical section of a trap embodying my invention. Fig. 3 is a plan of a modification of the form.

F is the fixture waste pipe, and A the inlet arm leading therefrom and containing a shallow dip D.

A' is the outlet arm.

C is the intermediate reservoir chamber having large horizontal dimensions and a vertical dimension but little exceeding the diameter of the waste pipe it serves.

W is the water standing in the dip and in the reservoir chamber up to the level of the overflow O, and forming in the dip D the seal proper of the trap.

In my previous patents in which I show a reservoir chamber between the inlet arm and the outlet arm, my aim has been to give the water way as contracted an area as possible in order to increase the scouring effect of the water passing through it, and I have therefore divided up the reservoir chamber by partitions.

In my present invention I leave the shallow reservoir chamber entirely unobstructed, so that the air passing through the shallow water under siphonage, has a free and unobstructed passage way over the water to the outlet, thus giving the maximum antisiphon quality to the trap.

Claim.

In a water seal trap the combination of an inlet arm A, and an outlet arm A', each substantially equal in area to that of the fixture waste pipe F, a shallow unobstructed reservoir chamber C between the two having a depth substantially equal to the diameter of the waste pipe F, but having a length and breadth much greater than this diameter, a shallow bend D connecting the bottom of the inlet arm with the bottom of the chamber C, and an outlet opening O of area substantially equal that of the waste pipe F opening out of the side of the chamber C at some distance above its bottom.

In testimony whereof I have affixed my signature, in presence of two witnesses.

JOHN PICKERING PUTNAM.

Witnesses:
FLORENCE J. DAVIS,
WILLIAM E. DOWNEY.